Jan. 3, 1939.  G. W. BECKER  2,142,708
RUBBER VALVE STEM FOR INNER TUBES AND THE LIKE
Original Filed Oct. 11, 1933   3 Sheets-Sheet 1
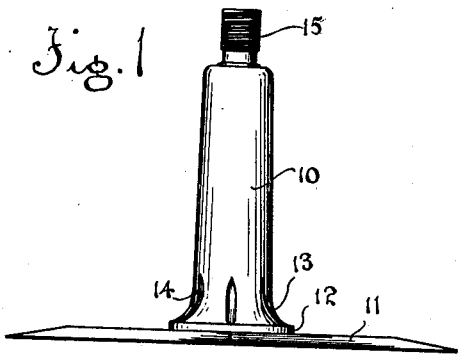
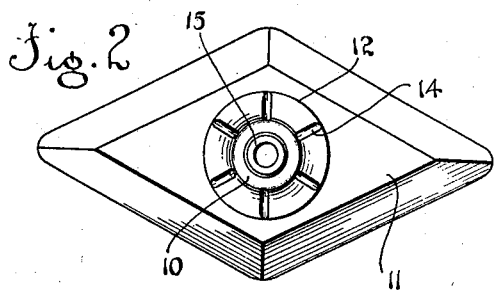
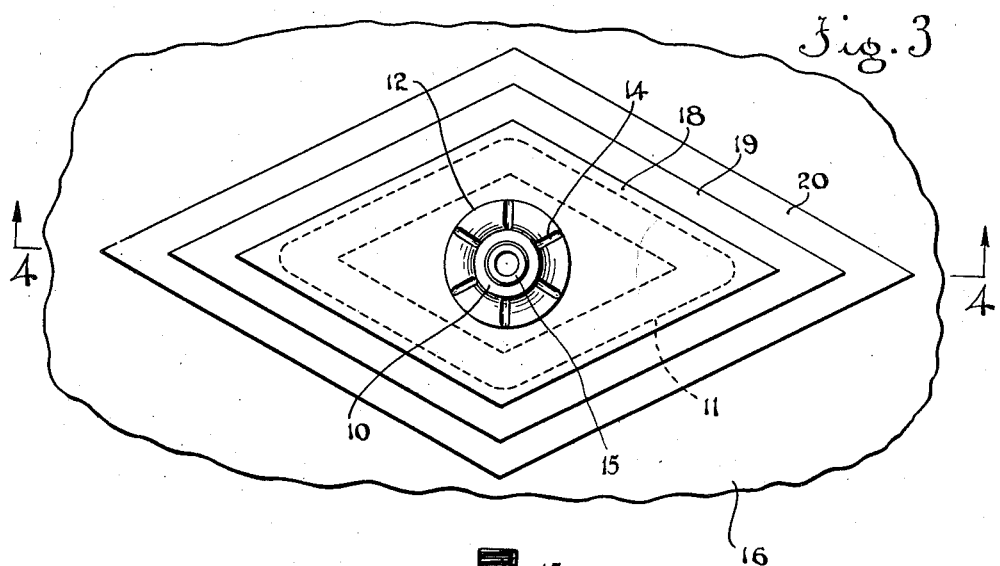
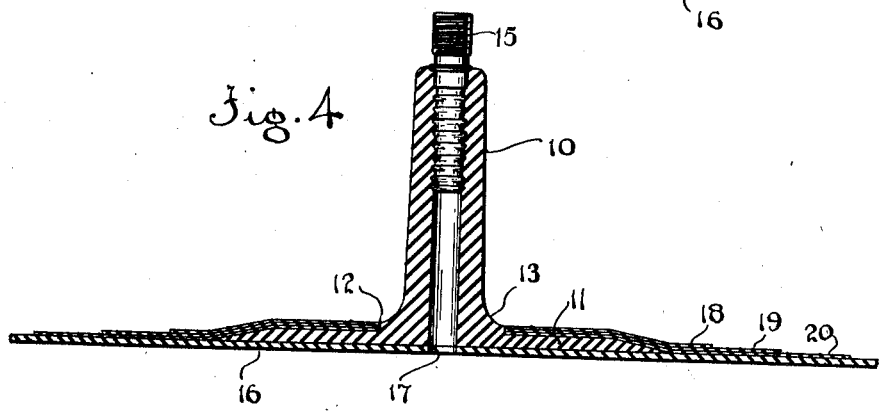
Inventor
George W. Becker
By Albert L. Ely
Attorney

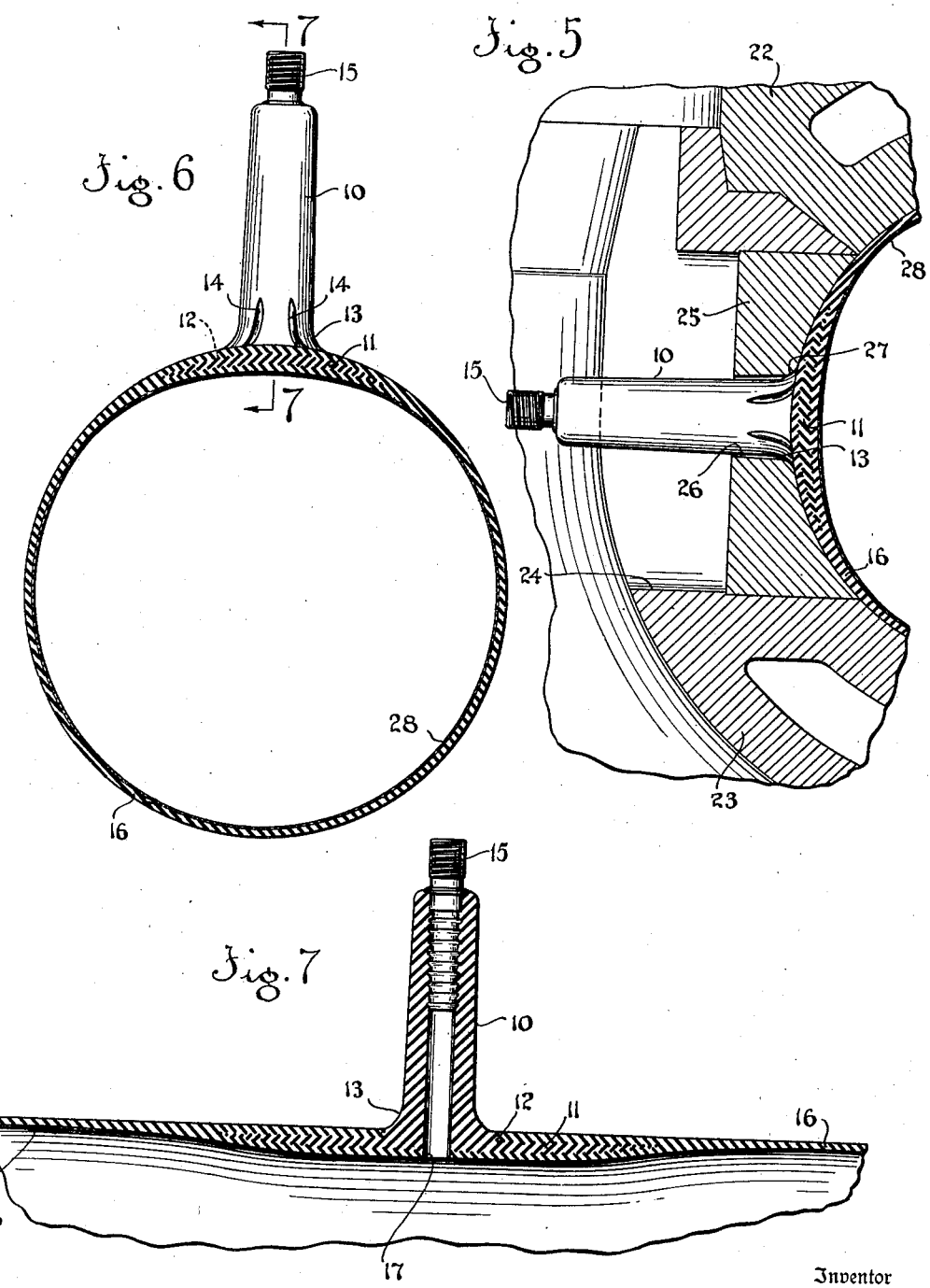

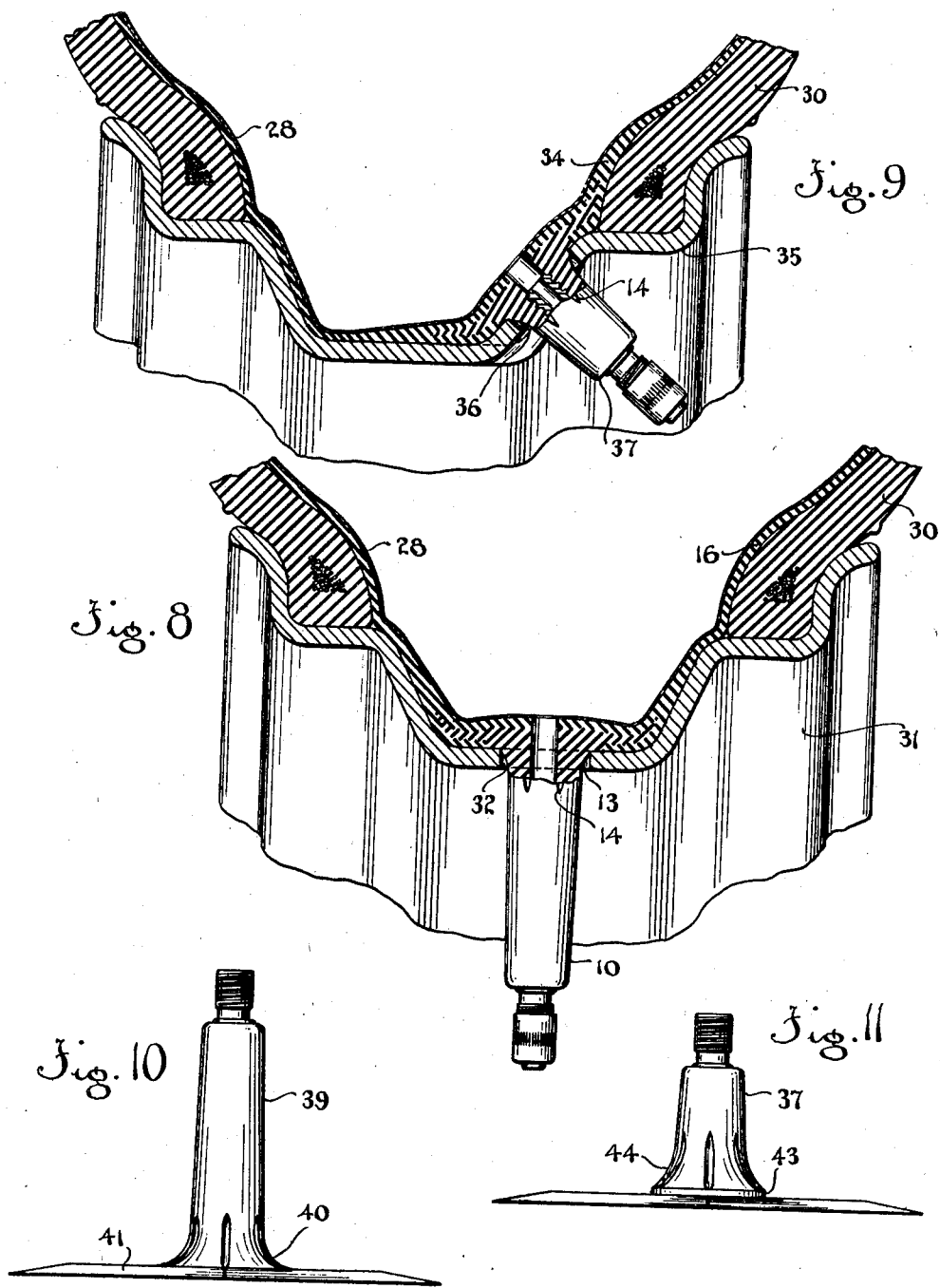

Patented Jan. 3, 1939

2,142,708

UNITED STATES PATENT OFFICE 2,142,708

RUBBER VALVE STEM FOR INNER TUBES AND THE LIKE

George W. Becker, Silver Lake, Ohio, assignor, by mesne assignments, to The Dill Manufacturing Company, Cleveland, Ohio, a corporation of Ohio Original application October 11, 1933, Serial No. 693,114. Divided and this application March 4, 1937, Serial No. 128,970

4 Claims. (Cl. 152—429)

This invention relates to rubber valve stems for use on inner tubes for pneumatic tires and for use on similar inflatable rubber articles.

The chief objects of the invention are to provide a construction in which the valve stem may not readily be torn from the tube; and a construction which positively prevents leakage of air at the connection between valve stem and tube. A further object is to provide an improved rubber valve stem which may be vulcanized to an inner tube to provide a smooth contour at the junction for eliminating any sharp shoulders or stepped-down portion between the valve stem and tube. Still another object is to provide a valve stem structure which will prevent the ingress of dirt and water to the interior of the tire rim through the valve stem hole. Other objects of the invention will be manifest.

This application is a division of my co-pending application Serial No. 693,114, filed October 11, 1933, now Patent Number 2,120,346, June 14, 1938.

Of the accompanying drawings:

Figure 1 is a side elevation of a rubber valve stem, in its preferred form, before it is incorporated in an inner tube;

Figure 2 is a plan view thereof;

Figure 3 is a plan view of a portion of the outer surface of an inner tube, and a rubber valve stem built into the wall thereof;

Figure 4 is a section on the line 4—4 of Figure 3;

Figure 5 is a fragmentary transverse section of a vulcanizing mold, and the improved valve stem and adjacent portion of an inner tube therein;

Figure 6 is a transverse section through a finished inner tube adjacent the valve stem thereof, the latter being shown in elevation;

Figure 7 is a section on the line 7—7 of Figure 6;

Figure 8 is a fragmentary transverse section through a pneumatic tire and a rim in which it is mounted, there being an improved inner tube in the tire;

Figure 9 is a view similar to Figure 8 showing the arrangement with an inner tube having a non-radial valve stem; and Figures 10 and 11 are side elevations of rubber valve stems of modified form.

Referring to the drawings, the rubber valve stem 10 shown therein is substantially cylindrical throughout its length, being provided only with sufficient taper or draft to permit easy removal from the mold in which it is made. At its base it is formed with an integral flange 11 preferably of rhombus or diamond shape, said flange having its marginal portion tapered or beveled substantially to a feather edge. At the juncture of the stem 10 and flange 11 is an annular shoulder or boss 12 that is concentric with the stem and of somewhat larger diameter than the latter, there being a substantial fillet or radius 13 where the stem joins said shoulder. The fillet 13 may be formed with a circumferential series of short, longitudinally disposed, shallow grooves 14, 14 if desired. The valve stem structure is partly or completely vulcanized before it is incorporated in a tube. Molded into the stem 10 and projecting from the end thereof remote from the flange 11 is the usual tubular metal insert 15 for receiving the valve mechanism of the structure.

In order to bring out the advantages of the present valve stem construction, further disclosure is made of the manner of incorporating same with an article on which it is to be used, for example, an inner tube for pneumatic tires.

The valve stem structure is mounted in an inner tube before the latter is vulcanized, and usually after it is spliced to annular form, a portion of a tube wall being shown at 16. The flange 11 of the valve stem is buffed on both sides, the outer surface of the tube about the inflation aperture 17 therein is cleaned and made tacky with suitable rubber solvent, and the valve stem flange applied and adhered to said cleaned portion, the long axis of the flange being disposed longitudinally of the tube, and the axial passage in the valve stem being aligned with the aperture 17 of the tube. Then a plurality of axially apertured, rhombus-shaped pieces of unvulcanized rubber 18, 19 and 20 respectively are superposed upon the flange 11 so as to overlie the margins thereof and extend onto the surface of the tube, the superposed pieces being treated with rubber solvent so as to adhere to each other and to the flange and tube. The pieces 18, 19 and 20 are relatively thin and of different sizes and are assembled so that their margins are in stepped or spaced relation to each other as shown. The axial apertures in said pieces are of the same diameter as the shoulder or boss 12 of the valve stem structure, and the thickness of the assembled pieces is substantially the same as the height of said shoulder so that the latter is concealed in the assembled structure, as is most clearly shown in Figure 4.

The assembled tube is then vulcanized in a mold under heat and internal pressure in the usual manner, a portion of the mold being shown in Figure 5. The mold shown comprises respective upper and lower mold sections 22, 23 that have their meeting edges offset from the central plane of the work, the lower mold section 23 being suitably recessed at 24 to receive a valve stem block 25 that is inset therein and formed with an aperture 26, disposed in the central plane of the mold, to receive the valve stem 10. The aperture 26 is of somewhat larger diameter than the valve stem so that but little of the latter is in contact with the block 25 during vulcanization of the tube, whereby overcuring of the stem is avoided. The inner end of the aperture 26 is rounded as at 27, the arrangement being such that during vulcanization the fillet 13 of the valve stem engages rounded portion 27, and the juncture of shoulder 12 and pieces 18, 19 and 20 engages the inner face of block 25 with the result that there is no flow of the rubber from said pieces past the shoulder 12, and a neat and efficient joint is produced. The finished inner tube and valve assembly is shown in section in Figures 6 and 7 wherein it will be seen that the overlying pieces 18, 19 and 20 have coalesced with each other and with the wall of the tube 16 so that the valve stem flange 11 is embedded centrally in the tube wall, and is firmly vulcanized thereto so as to form a unitary structure.

Preferably the interior surface of the tube 16 is treated with a composition 28 that seals the pores in the rubber of the tube and prevents the seepage of air therethrough. Such a composition is disclosed in the patent to Calvert, U. S. Patent No. 1,846,790.

In Figure 8 the inner tube is shown as it appears in inflated condition in a tire casing 30 mounted on a drop center rim 31. The latter is formed with an aperture 32 through which the valve stem 10 extends, said aperture being of such size that the inner corner thereof is engaged by the fillet 13 at the base of the valve stem whereby an effective seal is formed to prevent the entry of dirt and grit through said aperture. The grooves 14 in the valve stem permit the escape of entrapped air from between the inner tube and the rim, past the seal formed at the rim aperture 32.

The invention provides a strong and durable tube construction that will not leak at the juncture of valve stem and tube, and which achieves the several objects set forth in the foregoing statement of objects.

In Figure 9 the inner tube 34 is shown in inflated condition in a tire casing 30 that is mounted upon a drop center rim 35 that has a valve stem aperture 36 formed in one of the sidewalls of its central peripheral well or groove. The valve stem 37 of the inner tube is relatively short, and is disposed at an angle to the plane of the tube, but otherwise the tube is of the same construction as that previously described. The valve stem 37 as shown alone in Figure 11 is formed with the shoulder 43 and fillet 44.

The valve stem 39, Figure 10, lacks the shoulder or boss at its base, but it includes a relatively large fillet 40 at the juncture of stem and base flange 41.

Other modifications may be resorted to without departing from the spirit of the invention or the scope of the appended claims, which are not limited wholly to the specific construction shown or exact procedure described.

What is claimed is:

1. An inner tube structure comprising an endless rubber tube and a rubber valve stem, the latter being formed at one end with an annular concentric shoulder and a relatively large, integral flange extending beyond said shoulder, said flange being embedded in the wall of the tube to the depth of said shoulder, the tube wall being flush with the top of the shoulder.

2. An inner tube structure comprising an endless rubber tube and a rubber valve stem, the latter being formed at one end with a concentric shoulder and a base flange, the stem merging with the shoulder through a relatively large fillet and the latter being formed with a plurality of longitudinally disposed shallow grooves that extend substantially to the perimeter of the shoulder, the tube wall overlying the said base flange and laterally abutting said shoulder and being flush with the top thereof, the shoulder constituting a stop that prevents the tube-wall material from flowing into the said grooves during vulcanization of the tube.

3. A flexible rubber valve stem structure for inner tubes, said structure comprising a rubber stem having a metal insert in one end portion thereof, the opposite end of the stem being formed with an integral terminal base flange, and a relatively low cylindrical shoulder formed concentrically about the stem perpendicular to said base flange, there being a relatively large fillet extending from the top of the shoulder to the stem.

4. A rubber covered metal valve stem comprising a relatively large rubber flange formed integral with one end of the stem, there being a relatively low cylindrical shoulder formed concentrically of the stem and integral with the flange and stem at the juncture of the latter with the said flange, said shoulder being perpendicular to the latter and being of substantially greater diameter than the stem.

GEORGE W. BECKER.